(12) United States Patent
Takeda

(10) Patent No.: US 11,462,056 B2
(45) Date of Patent: Oct. 4, 2022

(54) INFORMATION PROCESSING DEVICE INCLUDING FACE AUTHENTICATION, CONTROL METHOD, AND MEDIUM

(71) Applicant: CANON KABUSHIKI KAISHA, Tokyo (JP)

(72) Inventor: Kyohei Takeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 61 days.

(21) Appl. No.: 17/010,323

(22) Filed: Sep. 2, 2020

(65) Prior Publication Data
US 2021/0073562 A1    Mar. 11, 2021

(30) Foreign Application Priority Data
Sep. 6, 2019 (JP) .............................. JP2019-163277

(51) Int. Cl.
*G06K 9/36* (2006.01)
*G06V 40/50* (2022.01)
*G06F 3/04842* (2022.01)
*G06V 40/16* (2022.01)
*G06F 21/32* (2013.01)

(52) U.S. Cl.
CPC .......... *G06V 40/50* (2022.01); *G06F 3/04842* (2013.01); *G06V 40/172* (2022.01); *G06F 21/32* (2013.01)

(58) Field of Classification Search
CPC .... G06V 40/172; G06V 40/16–40/179; G06V 40/50–40/58; G06V 40/70; G06F 3/04842; G06F 21/32
See application file for complete search history.

(56) References Cited

U.S. PATENT DOCUMENTS

| | | |
|---|---|---|
| 10,277,777 B2 | 4/2019 | Morii |
| 2013/0216108 A1* | 8/2013 | Hwang ................. G06V 40/50 |
| | | 382/118 |
| 2015/0043790 A1 | 2/2015 | Ono |
| 2016/0234023 A1* | 8/2016 | Mozer ................. H04L 63/0861 |
| 2017/0371601 A1* | 12/2017 | Kaneko ................. G06F 3/1238 |
| 2019/0180128 A1* | 6/2019 | Han ..................... G06V 40/197 |
| 2020/0082062 A1* | 3/2020 | Mequanint ............. G06F 21/44 |

FOREIGN PATENT DOCUMENTS

| | | |
|---|---|---|
| JP | 2015035178 A | 2/2015 |
| JP | 2015227048 A | 12/2015 |

* cited by examiner

*Primary Examiner* — Brian Werner
(74) *Attorney, Agent, or Firm* — Rossi, Kimms & McDowell LLP

(57) ABSTRACT

An information processing device is provided. The device performs operations including: when a first method of login using face authentication fails, receiving selection of a second method of login; in response to the selection of the second method of login, executing the second method of login; and in response to the selection of the second method of login, capturing an image of a user and executing registration, in a face authentication database, of face data acquired from the image captured as face data of the user used in the first method of login.

12 Claims, 11 Drawing Sheets

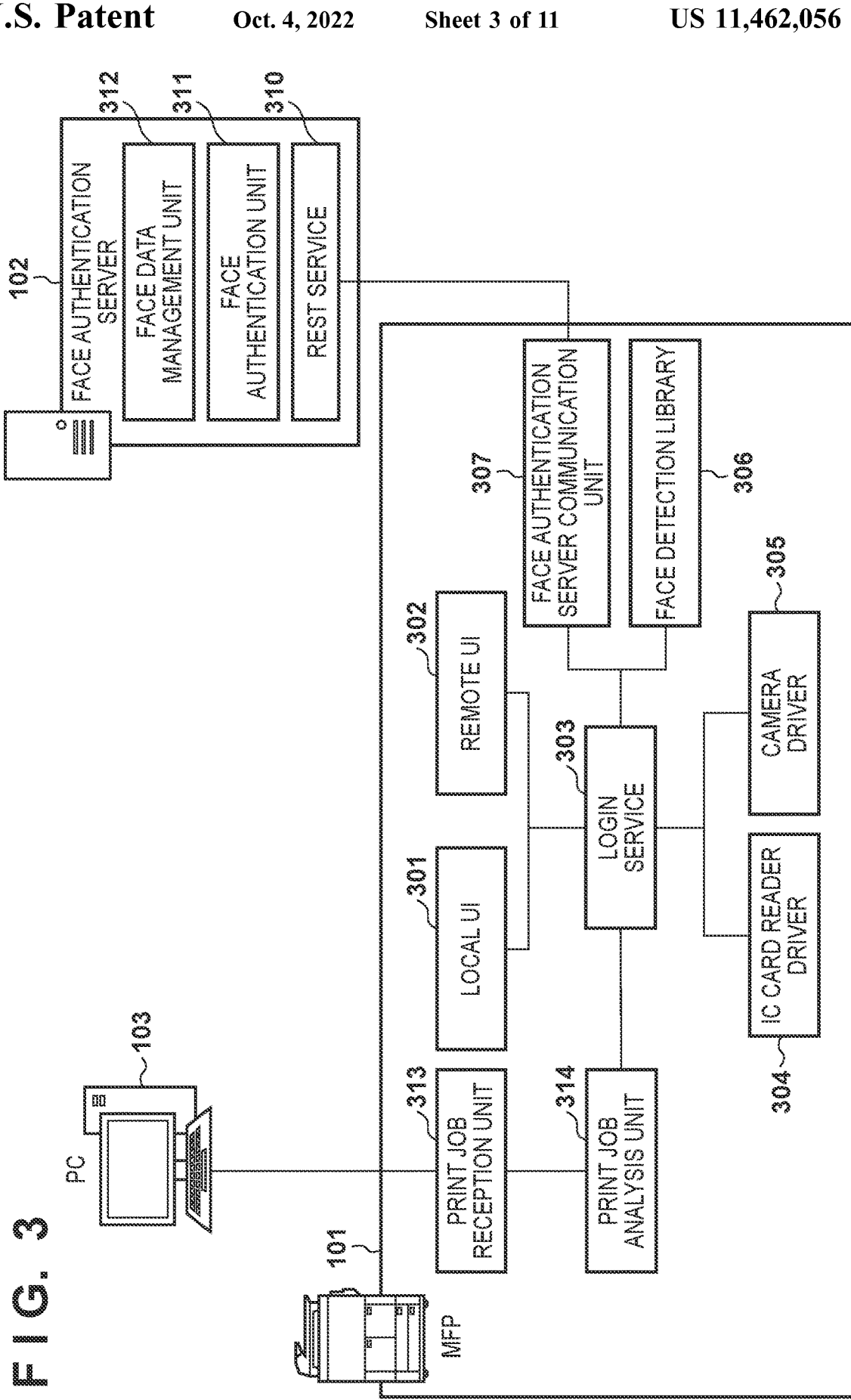

408

NEW USER REGISTRATION

| USER NAME: | Alice |
| --- | --- |
| PASSWORD: | ****** |
| EMAIL: | alice@conon.com |
| ICON: | BALL [SELECT] |
| CARD ID: | UNREGISTERED [REGISTERED] ← 409 |
| FACE IMAGE: | UNREGISTERED [REGISTERED] ← 410 |

[CANCEL] [REGISTERED] ← 411

412

KEYBOARD AUTHENTICATION

USER NAME: Alice

PASSWORD: ******

[LOGIN]

IC CARD LOGIN

PLEASE USE AN IC CARD

414

[TO KEYBOARD AUTHENTICATION] ← 415

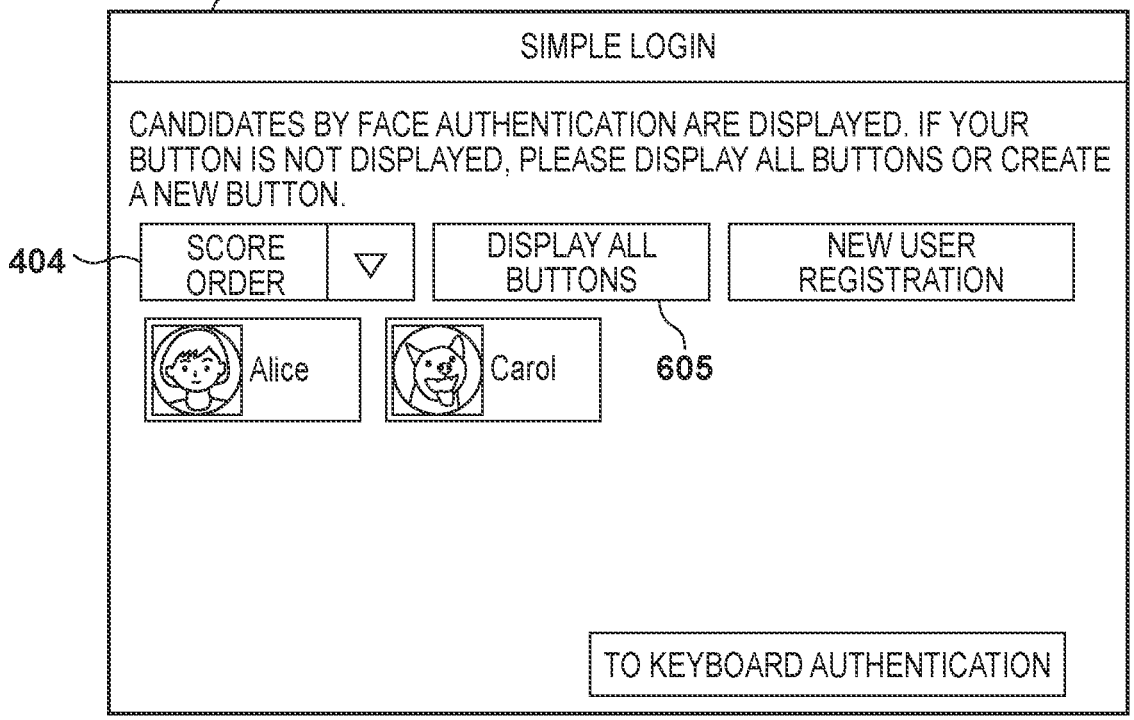
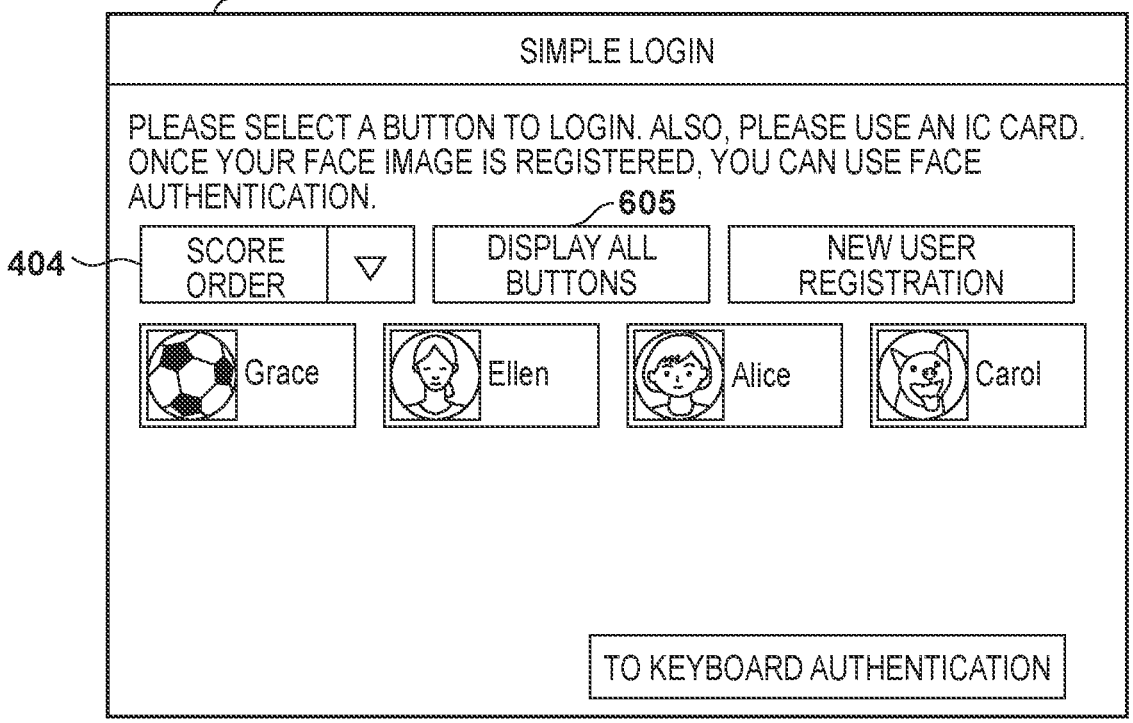

INFORMATION PROCESSING DEVICE INCLUDING FACE AUTHENTICATION, CONTROL METHOD, AND MEDIUM

BACKGROUND OF THE INVENTION

Field of the Invention

The present invention relates to an information processing device provided with a face authentication login function, a control method, and a medium.

Description of the Related Art

A known information processing device is provided with a face authentication login function that uses a face image as user identification information (see Japanese Patent Laid-Open No. 2015-35178). Another known information processing device provides a simple login function in which a user touches their own button displayed on a screen with a plurality of user buttons (see Japanese Patent Laid-Open No. 2015-227048).

Using a face authentication system requires face images of users to be registered. However, registration involves taking many face images beforehand and linking these to a user account, which is a time-consuming and troublesome task for the administrator. Even in the case in which the user performs the registration operation, the user must follow a guide and perform registration. This is also a time-consuming task.

SUMMARY OF THE INVENTION

The present invention enhances user-friendliness of a face authentication system by enabling a face image to be registered with the intervention of an administrator and without a registration step obvious to the user.

The present invention has the following configuration. According to an aspect of the present invention, provided is an information processing device, comprising: at least one processor; and at least one memory storing a program, wherein when the program is executed by a processor, an operation is executed by the information processing device, the operation including: when a first method of login using face authentication fails, receiving selection of a second method of login; in response to the selection of the second method of login, executing the second method of login; and in response to the selection of the second method of login, capturing an image of a user and executing registration, in a face authentication database, of face data acquired from the image captured as face data of the user used in the first method of login.

According to the present invention, user-friendliness of a face authentication system is enhanced by enabling a face image to be registered with the intervention of an administrator and without a registration step obvious to the user.

Further features of the present invention will become apparent from the following description of exemplary embodiments with reference to the attached drawings.

BRIEF DESCRIPTION OF THE DRAWINGS

FIG. 3 is a diagram illustrating the software configuration of a system.

FIGS. 6A to 6D are diagrams illustrating simple login screens displayed after face authentication.

DESCRIPTION OF THE EMBODIMENTS

Figure 1:
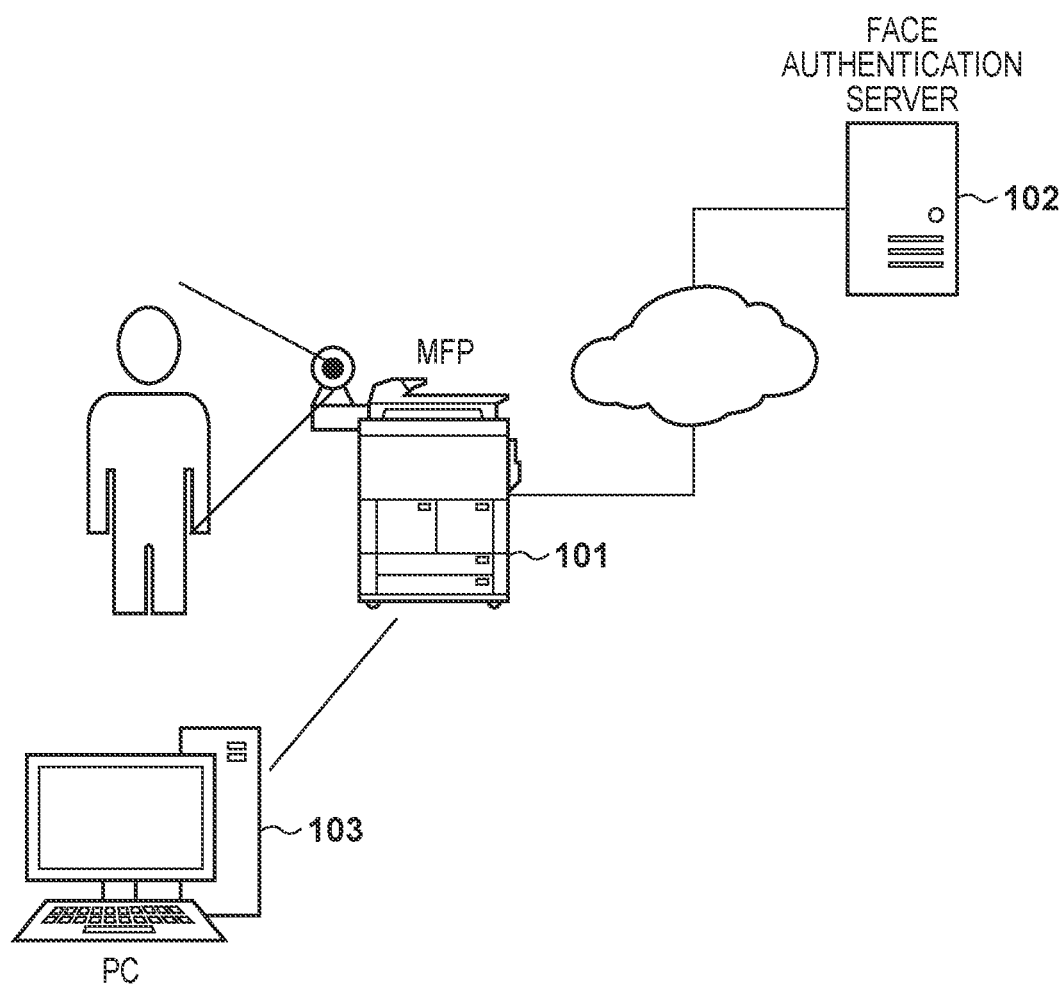
FIG. 1 is a diagram illustrating a system configuration.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

System Configuration

Figure 9:
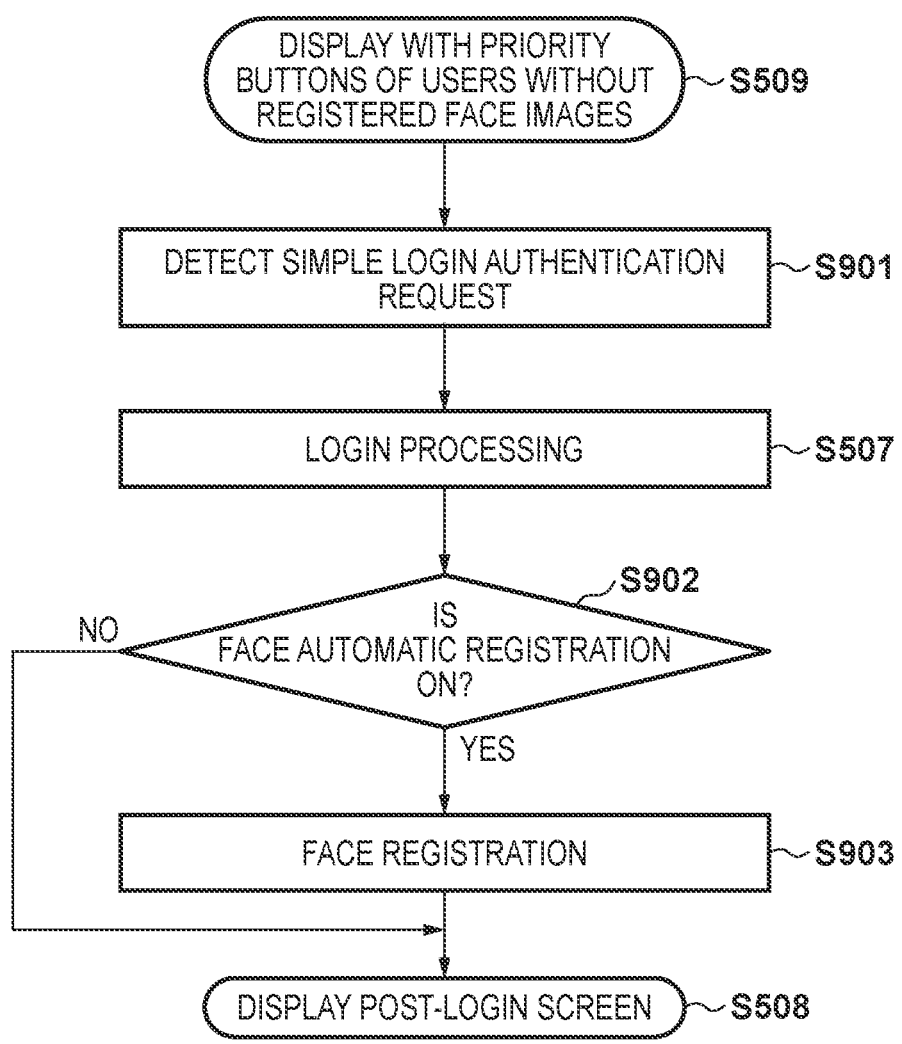
FIG. 9 is a flowchart illustrating face registration processing.

FIG. 1 is a configuration diagram illustrating an image forming system (also referred to as a face authentication system) including an image forming device, which is an application of the present invention. An MFP 101 is a Multifunction Peripheral (MFP) and, in the present embodiment, corresponds to an information processing device, which is an application of the invention. The MFP 101 uses a camera unit to capture an image of a user near the MFP 101 and executes face authentication. In the case in which the result of the face authentication satisfies a specific condition for allowing the user to log in, the user is automatically logged into the MFP 101. In the case in which, on the basis of the face authentication, the condition for automatic login is not satisfied, an alternative login method is provided to the user in the form of a simple login function using the face authentication result. Note that the simple login function includes a function in which user registration is executed using the user name of a print job received by the MFP 101 and a login function in which an objects (for example, buttons) corresponding to registered users are displayed on a screen and a user is to prompted to select a button of the user from among the displayed buttons. Also in the present embodiment, the simple login function is used in combination with registration of face data using face authentication. This is described in detail below with reference to FIGS. 5 and 9, for example. Note that face authentication may be referred to as a first system (or a first method) of authentication (or login), and simple login may be referred to as a second system (or a second method) of authentication (or login). Also, the first and second may be switched.

A face authentication server 102 receives face data from an authentication request source, executes face authentication, and sends back the authentication result (a candidate identifier and score) to the authentication request source. The face data is a captured face image or feature data of a feature value of a face image extracted by known technology from a face image. In face authentication, for example, the similarity between the feature data of the registered user face image stored in the face authentication server 102 and the feature data of the face image received from the request source is evaluated. Then, the user with a score above a certain reference value is set as a candidate, and the ID of the candidate, the score, and the like are sent back to the request source. The MFP 101 and the face authentication server 102 are connected via a LAN or the Internet. In the present embodiment, the face authentication server 102 is a service configured as a virtual server in the cloud. However, the face authentication server 102 may be an intranet server or the face authentication function may be integrated into the MFP 101. Note that "face authentication login function" refers to a function for executing face authentication and login and may be referred to simply as "face authentication function".

A personal computer (PC) 103 is an information processing device that transmits print jobs to the MFP 101. When the MFP 101 receives a print job, the MFP 101 can execute user registration using the user name of the PC 103. The PC 103 is connected to the MFP 101 via a LAN or the Internet.

MFP Hardware Configuration

Figure 2:
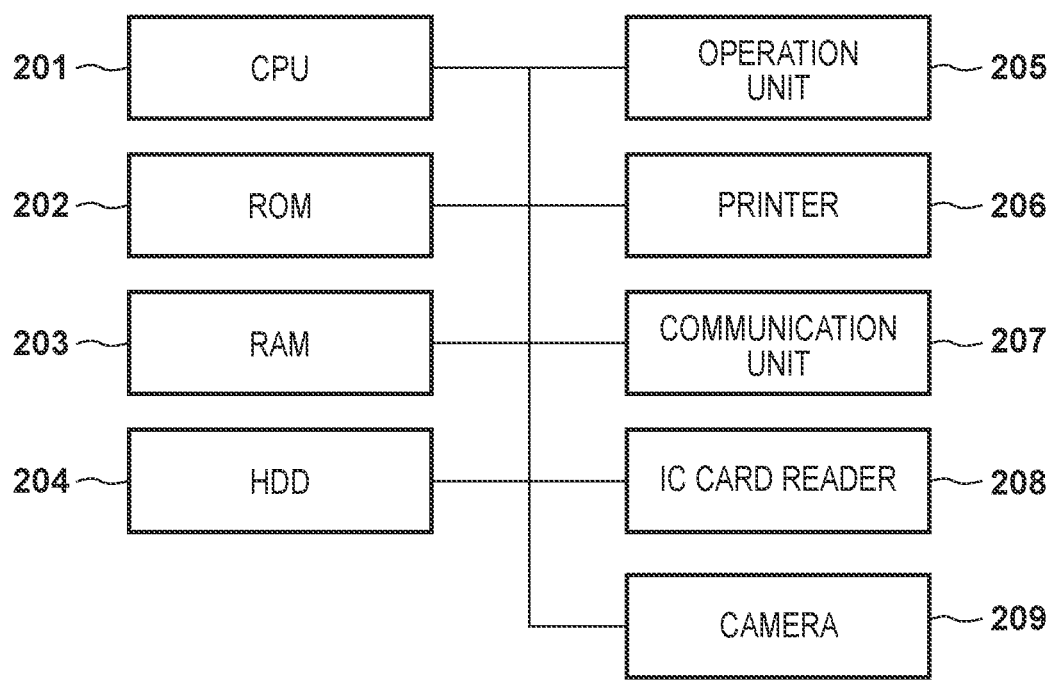
FIG. 2 is a diagram illustrating the hardware configuration of an MFP 101.

FIG. 2 is a simplified diagram illustrating the hardware configuration of the MFP 101. A CPU 201 is a central processing unit (processor) that controls all of the operations of the MFP 101. Random Access Memory (RAM) 203 is volatile memory and is used as a temporary storage area for developing various control programs stored in ROM 202 and HDD 204.

The ROM 202 is non-volatile memory and stores a boot program of the MFP 101 and the like. The HDD 204 is a non-volatile hard disk with a large capacity compared to the RAM 203. Programs for controlling the MFP 101 are stored in the HDD 204. Also, an Operating System (OS) and/or application programs are stored in the HDD 204.

When the MFP 101 is activated, the CPU 201 executes the boot program stored in the ROM 202. The boot program is configured to read out the OS program stored in the HDD 204 and develop the program on the RAM 203. When the boot program is executed, the CPU 201 then executes the OS program developed on the RAM 203 and executes control of the MFP 101. Also, the CPU 201 reads and writes data stored on the RAM 203 used in operations of the control program.

Note that in this embodiment, the MFP 101 is a single CPU 201 that executes the processing indicated in the following flowchart. However, in other embodiments, the MFP 101 may have a different configuration. For example, a configuration may be used in which a plurality of CPUs or microprocessors (MPU) cooperate to execute the processing indicated in the following flowchart. Also, a portion of the processing described below may be executed using a hardware circuit, such as an Application Specific Integrated Circuit (ASIC), a Field-Programmable Gate Array (FPGA), and the like.

An operation unit 205 is a display able to be operated via touch. Various user interfaces described below are displayed on the operation unit 205. A printer 206 is a printer engine that prints print data received from an external device via a communication unit 207. The communication unit 207 is a network interface for connecting to the Internet, an office Local Area Network (LAN), or the like.

An IC card reader 208 is a device for reading out, from an IC card, information used in user authentication. The IC card reader 208 is a unit required for realizing IC card authentication. A camera 209 is a camera unit for capturing an image of the face of a user who uses the MFP 101. The camera 209 may be an external camera able to be connected via USB, wireless LAN, and the like. Though not illustrated, a scanner unit may also be provided.

Software Configuration

FIG. 3 is a simplified diagram illustrating the software configuration of the MFP 101 and the face authentication server 102.

Software Configuration of the Face Authentication Server 102

The software configuration of the face authentication server 102 will now be described. A REST service 310 is a service that receives a request, via REpresentational State Transfer (REST), for face data registration or face authentication from a terminal (including the MFP 101) connected to the REST service 310 via the Internet. REST may be an XML-based or Hypertext Transfer Protocol (HTTP) web interface, for example. For example, face data and a user name are received via REST, and the received data and the user name are associated together and stored in a face data management unit 312. Here, a Personal ID is issued as a unique ID for identifying the user, and a notification of the Personal ID is sent to the request source terminal. For example, the face data management unit 312 manages a face authentication database containing the face data of a plurality of users, as listed in Table 1. Note that in Table 1, the user name may be a name of a user used for display and the like, and face data is only required to be in a format the face authentication server 102 can understand, such as face image data, feature data extracted from a feature value of a face image, and the like.

TABLE 1

| Personal ID     | User name | Face data |
| --------------- | --------- | --------- |
| 96df7500-7e82 . . . | Alice   | ********  |
| 6fc11e17-faf4 . . . | Carol   | ********  |
| 1fb233f6-1f8e . . . | Dave    | ********  |

When the REST service receives face data and a face authentication request, a face authentication unit 311 references the data of registrants listed in Table 1 and calculates a candidate/candidates and a score for each candidate. The score is a value indicating the likelihood that the candidate corresponds to the received face data and can be displayed as a percentage, for example. Instead of a percentage, the score may be displayed as a value in terms of natural numbers. The candidate corresponding to the received face data is determined by the score value. For example, a threshold may be set, and registered users corresponding to a score greater than this threshold may be determined to be candidates. Thus, the result of calculating the scores may be that no candidates are determined. Also, a plurality of candidates may be identified as candidates for the face data of one person. Furthermore, in the case in which the face data of a plurality of persons is included in the received face data, the score for each person is calculated, and a candidate for each is determined. The ID of the candidate obtained as a calculation result, the user name, and the corresponding score are sent back to the authentication request source terminal via the REST service 310.

Such a cloud service may be generally referred to as a cognitive service, and examples of services that provide a face authentication function include Face API from Microsoft (trademark), and the like. For example, Face API provides a REST service that is capable of receiving requests such as those in FIG. 2.

TABLE 2

| Request type | Function | Input Data | Output Data |
|---|---|---|---|
| Create | Register user information | User name, etc. | Personal ID, Identification ID of registered user |
| Add Face | Assign Personal ID and register face image | Face image | Face ID, Identification ID of registered face image |
| Detect | Detect face from image | Image | Face ID, Identification ID of detected face image |
| Identify | Assign Face ID and acquire face authentication result | Face ID | Personal ID of candidate and score |
| Get | Assign Personal ID and acquire user name, etc. | Personal ID | User name, etc. |

The MFP 101 can provide a face authentication login function to a user by linking with a cognitive service such as that described above.

MFP 101 Software Configuration

The software configuration of the MFP 101 will now be described. A local UI 301 of the MFP 101 provides a user interface, via a display of the operation unit 205, for the user to change settings and use functions of the MFP 101. Examples of a user interface provided by the local UI 301 are illustrated in FIGS. 4A to 4F. A remote UI 302 has a HTTP server function and provides to the user a user interface in HyperText Markup Language (HTML). The user can change the settings and use the functions of the MFP 101 by using a web browser of the user terminal and accessing the remote UI 302. The provided user interface screen may be the same as that of the local UI. A login service 303 is a software module that authenticates a user using the local UI 301 or the remote UI 302 and logs the user into the MFP 101. The login service 303 is capable of registering an administrator or a normal user account in the HDD 204 via the user interface of the local UI 301 or the remote UI 302. An example of an account information database including account information stored in the HDD 204 is illustrated in Table 3 below. In the HDD 204, as account information, a user name, password, IC card card ID, role (administrator/normal user), email address, and the like can be registered. Note that a user having a blank Personal ID means that face authentication registration has not been completed yet.

TABLE 3

| User name | Password | Card ID | Role | Email | Personal ID |
|---|---|---|---|---|---|
| Admin | ***** | ABC123456 | Administrator | admin@canon.com | |
| Alice | ***** | ABC123457 | Normal user | alice@canon.com | 96df7500-7e82 . . . |
| Bob | ***** | ABC123458 | Normal user | bob@canon.com | |
| Carol | ***** | ABC123459 | Normal user | carol@canon.com | 6fc11e17-faf4 . . . |
| Dave | ***** | ABC123460 | Normal user | dave@canon.com | 1fb233f6-1f8e . . . |

The user authentication function is off in the MFP 101 with factory settings, and when the MFP 101 is activated, the local UI 301 displays a menu screen 401 (FIG. 4A) for selecting an application. Note that though the term user authentication function is used, the simple login function is a function whereby a user is identified and logged in without user authentication being executed. Thus, strictly speaking, this is not a user authentication function. However, displaying "user authentication function" makes it easier for a user of the MFP 101 to understand, and thus in the first embodiment, such a display is used. The user authentication function able to be selected from a user authentication settings screen 402 (FIG. 4B) may also be referred to as the login function.

The user can display the user authentication settings screen 402 from the menu screen 401. In the user authentication settings screen 402, user authentication function on or off can be selected. Also, in the case in which user authentication function on is selected, one or more login functions including keyboard authentication, simple login, IC card authentication, and face authentication can be selected. The user authentication settings screen 402 is illustrated with the user authentication function on and all of the login functions selected.

In the case in which face authentication is on, the score threshold for allowing automatic login to the MFP in face authentication can be input into a text box 413 and set. For example, the score may be set to a value ranging from 1 to 100. Instead of the user inputting a value, a selection of big, medium, and small may be presented to the user for selection, or selection may be performed via a slider or another UI element. The settings selected by the user are stored in the HDD 204, and the login service 303 references these user settings and activates the login function in accordance with these user settings.

Figure 4A:
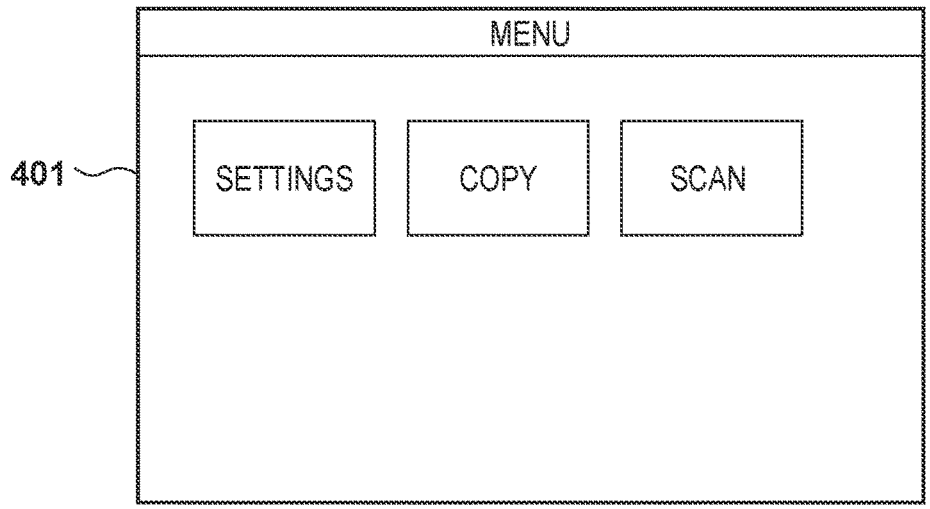
FIGS. 4A to 4F are diagrams illustrating user interfaces displayed on an operation unit of the MFP 101.
Figure 4B:
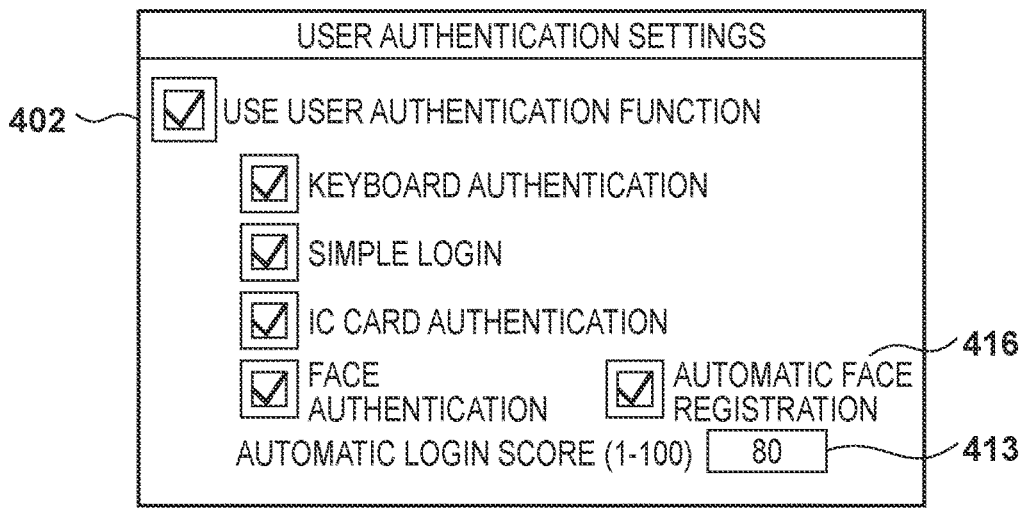
Figure 4C:
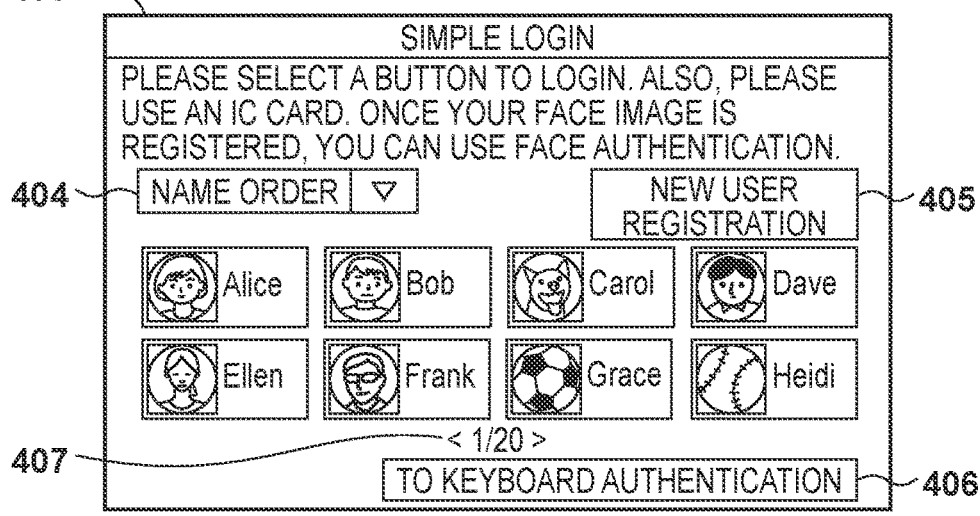
Figures 4D, 4E, 4F:
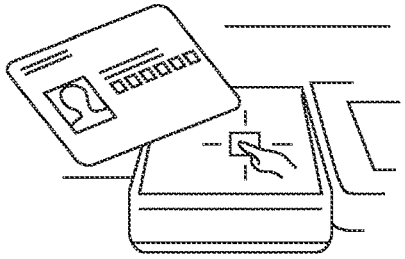

In the case in which all of the login functions (keyboard authentication, simple login, IC card authentication, face authentication) are on, the local UI 301 displays a simple login screen 403 (FIG. 4C). Note that IC card authentication can be executed from the screen 403 by the user by using an IC card, and keyboard authentication can be executed by selecting button 406 to transition to a keyboard authentication screen 412 (FIG. 4E). In other words, in the case in which the simple login function is set as the login function, the local UI 301 displays the simple login screen 403 even if the other login functions are on. Also, in the case in which the simple login function is not set, if only keyboard authentication is on, the keyboard authentication screen 412 is displayed, and if only IC card authentication is on or IC card authentication and keyboard authentication is on, an IC card authentication screen 414 is displayed. The IC card authentication screen 414 (FIG. 4F) provides a button 415 for displaying the keyboard authentication screen 412.

The login service 303 does not allow, as a login function, only face authentication function to be on. In the case in which the user sets face authentication from the user authentication settings screen 402, the local UI 301 controls the screen so that at least one more is set from among the three authentication settings. The simple login screen 403 (FIG. 4C) displays a button for each registered user. The user can be logged in to the MFP 101 by the user selecting their own button from the simple login screen 403. The processing here includes referencing the user ID of the selected button, and authentication processing to verify the authentication information is not executed. In other words, the user is not required to input authentication information using an IC card or a keyboard.

In the case in which the buttons of registered users cannot all be displayed on one screen, the buttons are displayed across a plurality of pages. A page transition button 407 is a button for transiting from the currently displayed page number to another page. The simple login screen 403 is provided with a sort function button. A sort order drop-down list 404 is a drop-down list for selecting the sort order of the buttons. For example, name order, registration order, last login time order, and the like can be selected.

A new user registration button 405 is a button for a normal user to newly register their account. The local UI 301 displays a user registration screen 408 (FIG. 4D) when a touch to the new user registration button 405 is detected. The user registration screen 408 receives input of a user name, password, email address, and the like of the newly registering user. Also, a function of selecting an icon to be displayed together with the user button on the simple login screen 403 is provided. Furthermore, in the case in which a touch to a card ID registration button 409 is detected, the IC card reader 208 is operated via an IC card reader driver 304, and the IC card data is put in a readable state. In the case in which an IC card is used on the IC card reader 208, the card ID is acquired from the IC card.

In the case in which a touch to a face image registration button 410 is detected, the camera 209 is operated via a camera driver 305, and an image of the user in front of the MFP 101 is captured. Also, using a face detection library 306, face detection processing is executed on the captured image, and checks whether a face is shown. OpenCV is a commonly known open-source library of functions including image processing, image analysis, machine learning, and the like. The face detection library 306 may use this opensource library. At the user registration screen 408, a card ID and a face image are not required to be registered and can be left unregistered.

In the case in which a touch to a registration button 411 is detected, the acquired information described above is registered in the HDD 204 as account information (Table 3). In the case in which an image including a face image is acquired by the face image registration button 410, a face data registration request is sent to the REST service of the face authentication server 102 via a face authentication server communication unit 307. Here, as necessary, the face data is transmitted in a format (a value calculated from an image file or only a feature value of the face) that can be understood by the face authentication server 102. The login service 303 receives a Personal ID as a reply to the face registration request, and the Personal ID is registered in the HDD 204 as account information (Table 3).

The login service 303 is capable of determining whether or not a user has registered a face image from whether or not the account information (Table 3) contains a Personal ID. A face image file, information indicating whether or not a face image has been registered, and the like may be associated with the account information of the HDD 204 and recorded. Also, relating to account information registration, a function (MFP administrator only UI for the local UI 301 or the remote UI 302) by which the account information of a plurality of users can be registered all at once may be provided. The card IDs and face images used for batch registering by the administrator may be data acquired from a device other than the IC card reader 208 and the camera 209 of the MFP 101.

In the case in which the login service 303 detects an IC card, the account information stored in the HDD 204 is referenced, and the user that matches the card ID is logged into the MFP 101. Also, in the case in which a touch to the button 406 for displaying keyboard authentication is detected, the keyboard authentication screen 412 is displayed and an input of the user name and password is received. The login service 303 references the user name and password input into the keyboard authentication screen 412 and the account information stored in the HDD 204, and if they match, the user is logged into the MFP 101.

The login service 303 stores information of the logged in user in an object called a login context, which is then transferred to another software module. An example of the information stored in the login context is illustrated in Table 4. In the login context, as illustrated in Table 4, the user name, role, email address, and the like of the logged in user is stored.

TABLE 4

| Item | Value |
| --- | --- |
| Login user name | Alice |
| Role | Normal user |
| Email | alice@canon.com |

In the case in which login to the MFP 101 is successful, the local UI 301 closes the login screen such as the simple login screen 403 and transitions to the menu screen 401. On the menu screen 401, a menu screen personalized to the logged in user is provided by referencing the login context described above and identifying the user who logged in. A function capable of personalizing the menu screen and the screens for the various functions (copy, scan, and the like) depending on user preferences is provided.

A print job reception unit 313 standbys to receive a print job via the communication unit 207 of the PC 103 or the like and, when a print job is received, notifies a print job analysis unit 314 of the job. The print job analysis unit 314 analyzes the received job and notifies the login service 303 of the user name of the job.

Face Authentication Operation Flow

Next, the operation when the login service 303 executes face authentication will be described with reference to the flowchart of FIG. 5. The process of FIG. 5 may be started, for example, when a sensor (not illustrated) detects a person nearby, a touch on the operation unit 205 is detected, or the like. Also, in the present embodiment, at least two login functions, face authentication function and simple login function, are on. Thus, for example, a user interface may be set in which, at the user authentication settings screen 402 of FIG. 4B, face authentication and simple login are combined as a setting. Alternatively, a condition for executing the process of FIG. 5 may be that at least face authentication and simple login are selected. The login service 303 is executed by the CPU 201 of the MFP 101 controlling the program of the login service 303 loaded on the RAM 203.

When the simple login screen 403 is displayed on the local UI 301, the login service 303 activates the camera 209 via the camera driver and starts image capture of the user near the MFP 101 (step S501). The login service 303 routinely acquires a captured image from the camera (step S502). Next, the login service 303 uses the face detection library to execute face detection processing on the acquired captured image, checks whether or not a face is shown, and determines how many faces are shown (step S503).

If the number of detected faces is zero (no faces are shown), then the process returns to step S502 and a new captured image is acquired. If the number of detected faces is 1, the process moves to step S504 and executes face authentication processing. In step S504, the acquired captured image and a face authentication request is transmitted to the REST service 310 of the face authentication server 102 and, as that reply, a Personal ID and user name of a candidate and a face authentication score are acquired.

Next, the number of candidates acquired from the face authentication server 102 is checked (step S505). If the number of acquired candidates is one, the process moves to step S506 and whether or not the acquired score is greater than or equal to a threshold is determined. The threshold is a value set for the automatic login score in the text box 413 of the user authentication settings screen 402. The default value of the MFP with factory settings may be a value pre-recorded in the ROM of the MFP. If the score is greater than or equal to the threshold, the process moves to step S507 and the identified single candidate is logged into the MFP (step S507). In the login processing step S507, the account information (Table 3) is referenced, the role, email address, and the like of the user that matches the user name and Personal ID acquired from the face authentication server 102 is acquired, and a login context (Table 4) is generated. Next, the login service 303 displays on the local UI 301 screen the menu screen 401 of FIG. 4A as a screen for a logged-in user and provides functions personalized to the logged in user (step S508).

In step S505, if the number of acquired candidates is zero, in other words face authentication failed, the user near the MFP 101 can be determined with high likelihood to be a user without a registered face image or a user without registered account information. Accordingly, the login service 303 displays a customized simple login screen in which the button of a user without a registered face image is displayed with priority (step S509). Examples of customized simple login screen to be displayed when the face authentication is failed are illustrated in FIGS. 6A to 6D. In the case in which Bob and Frank have not registered a face image, as illustrated on a screen 601 (FIG. 6A) for example, only the buttons of Bob and Frank are displayed. Also, the user is also likely to have not registered account information, and thus the new user registration button 405 may be displayed in a highlighted manner.

Even if the number of acquired candidates is one in step S505, if the acquired score is determined to not satisfy the threshold in step S506, the login service 303 displays a customized simple login screen in which the button of the single candidate is displayed with priority (step S510). For example, in the case in which the single candidate is Alice, as illustrated on a screen 602 (FIG. 6B), only the button of Alice is displayed. In step S505, in the case in which the number of candidates is two or more, the buttons of the candidates are displayed with priority in order of highest score (step S511). Using the values in Table 5 below as an example of the user names and scores acquired in step S504, as illustrated in a screen 603 (FIG. 6C), the login service 303 displays the buttons in order of Alice, Carol, sorted from left to right in order of highest score. In the screen 603, higher scores are placed in order from the left.

TABLE 5

| User name | Score |
|---|---|
| Alice | 70 |
| Carol | 15 |

Figure 7:
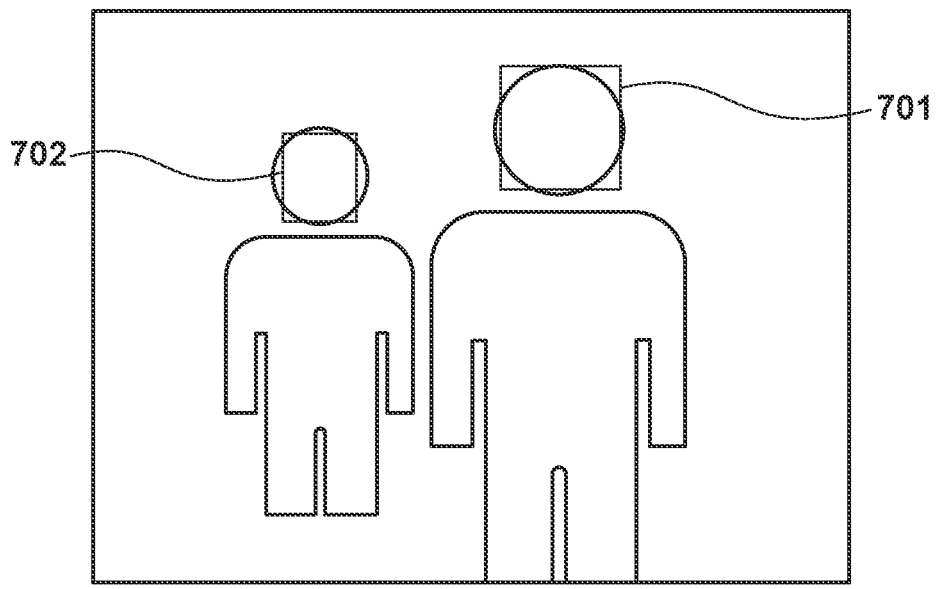
FIG. 7 is a diagram illustrating an image captured when detecting a plurality of faces.

In the case in which the number of detected faces is two or more in step S503, in step S512, the edge of each detected face is cropped to a rectangular shape, and the rectangular size is compared. The larger face corresponds to the user nearer to the MFP 101, and thus is determined with high likelihood to belong to the user trying to log in to the MFP 101. For example, as the face detection results, rectangle 701 and rectangle 702 are cropped from the captured image of FIG. 7. In FIG. 7, the face image of the rectangle 701 is larger than the face image of the rectangle 702. In other words, the face image of the rectangle 701 with the larger occupation ratio in the captured image is estimated with high likelihood to be the user trying to log in.

Next, in step S513, the face image of the rectangle 701 and a face authentication request is transmitted to the REST service of the face authentication server 102 and, as that reply, a Personal ID and user name of a candidate and a face authentication score are acquired. Then, the face image of the rectangle 702 and a face authentication request is transmitted to the REST service 310 of the face authentication server 102 and, as that reply, a Personal ID and user name of a candidate and a face authentication score are acquired. For example, in the case in which the user names and scores in Table 6 are acquired as the face authentication results of the face image of the rectangle 701 and the user names and scores in Table 7 are acquired as the face authentication results of the face image of the rectangle 702, the login service 303 displays the buttons sorted in order by largest face image then highest score, as illustrated in a screen 604 (FIG. 6D). In other words, the buttons of the obtained candidates are placed in order of largest face image, and, in the case in which a plurality of candidates are obtained for a single face image, then the buttons are placed in order of highest score. In the example below, Alice's score is the highest. However, because the size of the face image is given priority over the score, the buttons are displayed in order of Grace, Ellen, Alice, Carol. In other words, a first display order is determined on the basis of each rectangular area in a plurality of face images, then a second display order is determined on the basis of the score results of each face image.

TABLE 6

| User name | Score |
|---|---|
| Grace | 60 |
| Ellen | 10 |

TABLE 7

| User name | Score |
|---|---|
| Alice | 70 |
| Carol | 15 |

For a user unable to log in via face authentication, one of the simple login screens 601, 602, 603, 604 illustrated in FIGS. 6A to 6D may be provided, and the user can touch a button to be logged into the MFP 101. Also, to prevent false positive detection errors, operation errors, and spoofing, when login the user is logged in via face authentication or by touching a simple login button, a screen for inputting a password may be displayed prompting the user to input a password.

In the case in which only buttons displayed with priority are filtered and displayed, such as in the simple login screens 601, 602, 603, 604, in some cases, as a result of a detection error in face authentication, your own button may not be displayed despite having registered account information. For such cases, a button 605 is displayed on the simple login screen for displaying all of the buttons. By touching the button 605, all of the buttons of the candidates acquired from the face authentication server 102 are displayed.

Also, a button sort function 404 is provided for cases in which, even though only candidate buttons displayed with priority are filtered and displayed, a plurality of buttons are displayed. In addition to score order, name order, registration order, last login time order, and the like can be selected. In other words, the buttons of the users are sorted in score order in the processing of FIG. 5. However, the user at their own discretion can then change the sort order.

Also, instead of limiting the buttons displayed to only the buttons displayed with priority, all of the buttons may be displayed at all times. In this case, preferably, the buttons displayed with priority are displayed from the top, and other non-priority buttons are displayed sorted by name order across a plurality of pages.

As described above, with an image forming device according to the present invention, the conditions for allowing login via face authentication is limited by the number of candidates or score and security risk associated with a different user being automatically logged in is reduced. Also, in the case in which login via face authentication is unsuccessful, the button of the user with high likelihood is displayed with priority as illustrated in the simple login screens 601, 602, 603, 604. Thus, the simple login screen is more user-friendly than one that does not use face authentication.

Figure 5:
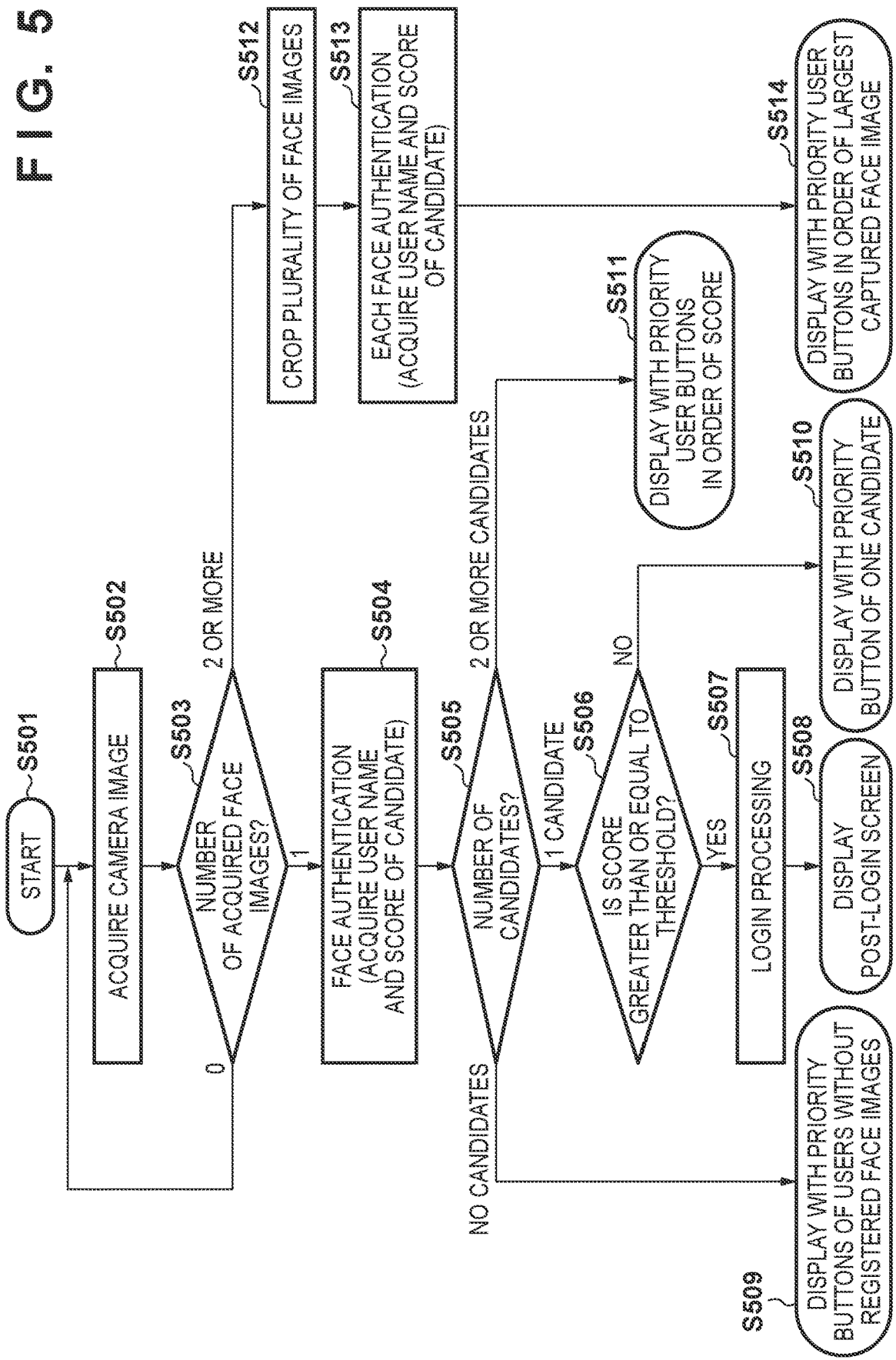
FIG. 5 is a flowchart illustrating face authentication processing.
Figure 6A:
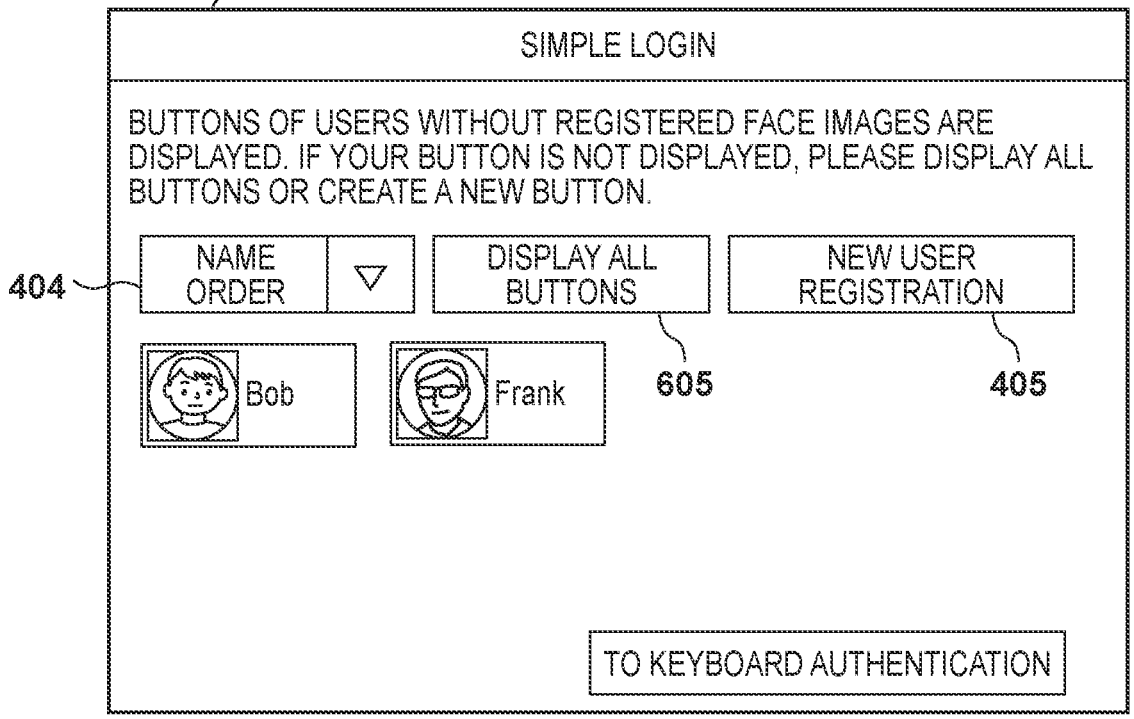
Figure 6B:
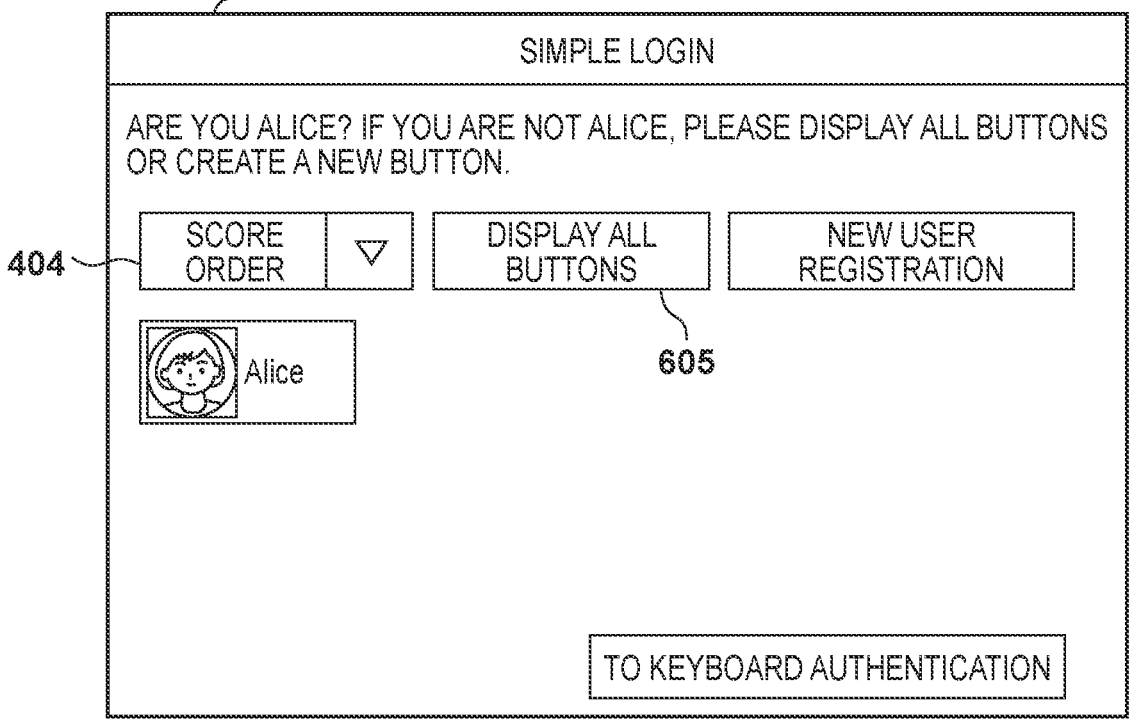

Note that even in the case in which a plurality of candidates are found in step S505 of FIG. 5, if only one of the candidates has a score greater than or equal to the threshold (may be the same threshold referenced in step S506), this candidate may be automatically logged in as the login user. Also, even in the case in which the captured image is found to include a plurality of users in step S503 of FIG. 5, if only the candidate with the largest face image has a score greater than or equal to the threshold (may be the same threshold referenced in step S506), this candidate may be automatically logged in as the login user. Furthermore, in such cases, a pre-login confirmation step, such as making the user touch a confirmation button, may be provided before automatic login is executed.

Face Registration Operation Flow

The registration flow of the present embodiment will now be described. In this example, a print job is received from a user that is using the MFP 101 for the first time.

Figure 8:
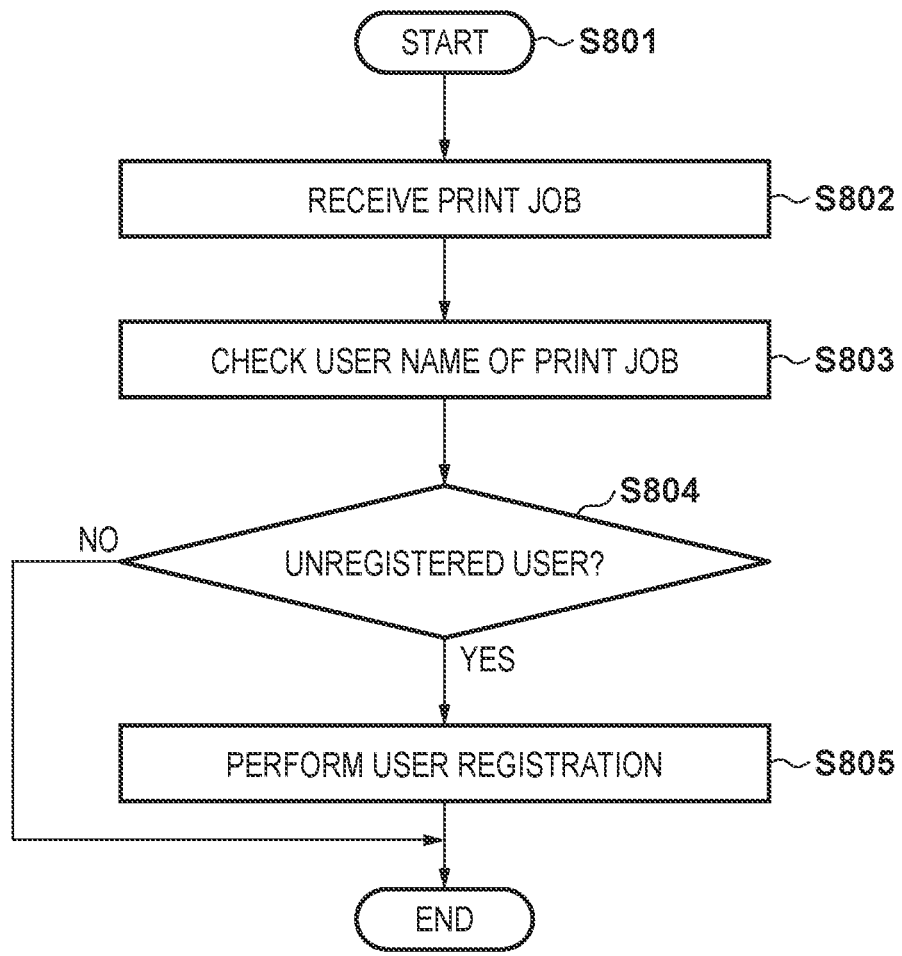
FIG. 8 is a flowchart illustrating user registration when a print job is received.

The operation when user registration is executed after a print job is received will be described with reference to the flowchart of FIG. 8. When a print job is transmitted from the PC 103 (step S801), the print job reception unit 313 of the MFP 101 receives the print job (step S802). The print job analysis unit 314 analyzes the received job and the user name of the job is confirmed (step S803). The print job analysis unit 314 notifies the login service 303 of the user name. In the login service 303, the account information (Table 8) registered in the HDD 204 is referenced, and a comparison of the registered user name and the received user name is executed (step S804). If the user is not registered, the login service 303 executes new user registration to register account information (step S805). Here, only the user name is registered, and other items are left blank. For example, in the example of Table 8, for Frank, the user who transmitted the job, only the user name is registered.

TABLE 8

| User name | Password | Card ID | Role | Email | Personal ID |
|---|---|---|---|---|---|
| Admin | ***** | ABC123456 | Administrator | admin@canon.com | |
| Alice | ***** | ABC123457 | Normal user | alice@canon.com | 96df7500-7e82 . . . |
| Bob | ***** | ABC123458 | Normal user | bob@canon.com | |
| Carol | ***** | ABC123459 | Normal user | carol@canon.com | 6fc11e17-faf4 . . . |
| Dave | ***** | ABC123460 | Normal user | dave@canon.com | 1fb233f6-1f8e . . . |
| Frank | | | | | |

When a user comes in front of the MFP 101, the face authentication processing described with reference to the flow of FIG. 5 is executed. Because no Personal ID is registered for Frank, who printed for the first time, seen as in Table 8, in step S509, Frank is determined to be a user without a registered face image, and the screen 601 is displayed.

When the user button (for example, Frank's button) on the screen 601 is clicked, the login service 303 detects a simple login authentication request (step S901).

When the login service 303 acquires the user name of the button clicked, the login processing described above is executed (step S507). This is as described with reference to FIG. 5.

When login is completed, whether or not to execute face automatic registration is confirmed (step S902). However, this is determined by whether or not automatic face registration 416 of the user authentication settings screen 402 of FIG. 4B is on. In the present embodiment, a switch such as 416 for switching face automatic registration on or off is provided. However, the present proposal can also be applied to a system in which this is always on or off.

In the case in which automatic face registration is off, face registration is not executed, and the login service 303 displays on the local UI 301 screen the menu screen 401 as a screen for a logged-in user and provides functions personalized to the logged in user (step S508).

In the case in which the face automatic registration 416 is on in step S902, the captured image acquired in step S502, the user name, and a face registration request are transmitted to the REST service 310 of the face authentication server 102, and the captured image is registered (step S903). Here, in the case in which a plurality of faces are included in the image, these face images may be displayed on the user interface screen and the user may select a face image to transmit from among the face images. At the REST service 310, face data and a user name are received, and the received data and the user name are associated together and stored in a face data management unit 312. Here, a Personal ID is issued as a unique ID for identifying the user, and a notification of the Personal ID is sent to the request source terminal. The login service 303 records the notified Personal ID in the account information. For example, in the example of Table 9, a Personal ID has been issued and registered for Frank. Note that in this example, a role is not defined for a new user. However, login via face authentication can be executed with new users being given the role with the least privileges by default.

TABLE 9

| User name | Password | Card ID | Role | Email | Personal ID |
| --- | --- | --- | --- | --- | --- |
| Admin | ***** | ABC123456 | Administrator | admin@canon.com | |
| Alice | ***** | ABC123457 | Normal user | alice@canon.com | 96df7500-7e82 . . . |
| Bob | ***** | ABC123458 | Normal user | bob@canon.com | |
| Carol | ***** | ABC123459 | Normal user | carol@canon.com | 6fc11e17-faf4 . . . |
| Dave | ***** | ABC123460 | Normal user | dave@canon.com | 1fb233f6-1f8e . . . |
| Frank | | | | | ba44343f-c144 . . . |

As described above, according to an image forming device according to the present embodiment, a user can execute face automatic registration via an authentication operation from a simple login screen without requiring the administrator to execute face registration in advance. Also, from the next time onward, the user can log in via face authentication without touching any buttons by simply standing in front of the MFP. In this way, this image forming device is more user-friendly than one that does not use face authentication.

Second Embodiment

Figure 10A:
FIGS. 10A and 10B are diagrams illustrating detailed screens for face registration.

The settings of the face automatic registration 416 setting cannot be changed by the user. However, in another embodiment, the user can select to turn face registration on or off at the time of registration, as illustrated by a button 1001 of the simple login screen 601 in FIG. 10A. As the management of face data is difficult in terms of privacy concerns, this can be selected depending on the use environment.

Figure 10B:

Also, a screen such as a screen 1003 illustrated in FIG. 10B may be provided that allows the user to change detailed settings of the face image to be registered. When a user without a registered face image touches a face detailed registration button 1002 of the simple login screen after transmitting a job, the screen transitions to the detailed registration settings screen 1003. Here also, the process of FIG. 5 is started and an image is acquired from the camera 209 in step S502 and image data for which the number of acquired face images is determined to be one in step S503 is displayed on a face image 1004 of the screen 1003. In the case in which the image data is selected from a plurality of image data, the steps of S502 and S503 are repeated as many times as necessary. When the user checks a check box 1005 corresponding to discretionary image data and touches a registration button 1007, the face authentication processing of step S504 is executed. Also, in the case in which the user wishes to select from other image data, the user touches a recapture button 1006 and the image capture processing is repeated as many times as necessary and the display of the face image 1004 is updated with the new image data.

Also, when the user button is displayed, the user may select whether or not to display the face image as the icon. In the case in which a face image is not used, the user name only may be displayed, an image other than a face selected by the user may be displayed, or the like. In this case, the same icon being used by another person is not preferable. Thus, the user may only be able to select an icon from images provided by the system.

With such a configuration, the user can select whether or not to use simple login via face registration. Also, a desired image can be selected from among a plurality of face images and be registered.

Third Embodiment

In the first embodiment, in the case in which a simple login authentication request is detected in step S901, face registration processing is executed. However, in the case in which an authentication request is received via the keyboard authentication 412 or the IC card login 414, a similar face registration processing can be applied.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-163277, filed Sep. 6, 2019 which is hereby incorporated by reference herein in its entirety.

What is claimed is:

1. An information processing device, comprising:
at least one processor; and
at least one memory storing a program, wherein
when the program is executed by a processor, an operation is executed by the information processing device,
the operation including:
when a first method of login using face authentication fails, receiving selection of a second method of login;
in response to the selection of the second method of login, executing the second method of login; and
in response to the selection of the second method of login, capturing an image of a user and executing registration, in a face authentication database, of face data acquired from the image captured as face data of the user used in the first method of login;
wherein the selection includes, when the first method of login fails for the user, displaying an object corresponding to a user, from among users with registered account information used in the second method of login, with face data not previously registered in the face authentication database, and selecting the object being received as selection of the second method of login for a user corresponding to the object selected.

2. The information processing device according to claim 1, wherein
the registration includes
in response to the selection of the second method of login, registering the face data acquired from the image captured in the face authentication database as face data of the specific user corresponding to the object selected.

3. The information processing device according to claim 1, wherein
the registration includes
displaying the image captured, and, in response to a confirmation operation by the user, registering the face data acquired from the image as the face data of the user in the face authentication database.

4. The information processing device according to claim 3, wherein
the registration includes
capturing a plurality of images of the user, displaying the plurality of images captured, and, in response to a selection operation by the user, registering the face data acquired from the image selected as the face data of the user in the face authentication database.

5. The information processing device according to claim 3, wherein
the registration includes recapture of an image in response to a user operation.

6. The information processing device according to claim 5, wherein
the registration includes, in a case in which the recapture is executed, a displayed image is updated with a recaptured image.

7. The information processing device according to claim 3, wherein
the registration includes displaying an image captured in accordance with settings for whether or not to display the image captured being set to display.

8. The information processing device according to claim 1, wherein
the method further includes
setting whether or not to execute registration of the face data via the registration; and
the registration includes registering the face data in the face authentication database in accordance with settings for whether or not to execute registration of the face data.

9. The information processing device according to claim 1, wherein
the registration includes registering the face data in the face authentication database in response to an operation by a user for executing registration of the face data.

10. The information processing device according to claim 1, wherein
the method further includes
receiving a job including a user name; and
registering a user of the user name included in the job received in account information used in the login method.

11. A non-transitory computer-readable medium storing a program which causes a computer to,
when a first method of login using face authentication fails, receive selection of a second method of login;
in response to the selection of the second method of login, execute the second method of login; and
in response to the selection of the second method of login, capture an image of a user and execute registration, in a face authentication database, of face data acquired from the image captured as face data of the user used in the first method of login,
wherein the selection includes, when the first method of login fails for the user, displaying an object corresponding to a user, from among users with registered account information used in the second method of login, with face data not previously registered in the face authentication database, and selecting the object being received as selection of the second method of login for a user corresponding to the object selected.

12. A method for controlling an information processing device, comprising:
when a first method of login using face authentication fails, receive selection of a second method of login;
in response to the selection of the second method of login, execute the second method of login; and
in response to the selection of the second method of login, capture an image of a user and execute registration, in a face authentication database, of face data acquired from the image captured as face data of the user used in the first method of login,
wherein the selection includes, when the first method of login fails for the user, displaying an object corresponding to a user, from among users with registered account information used in the second method of login, with face data not previously registered in the face authentication database, and selecting the object being received as selection of the second method of login for a user corresponding to the object selected.

\* \* \* \* \*